United States Patent [19]

Miller et al.

[11] 4,343,773
[45] Aug. 10, 1982

[54] ENHANCED LEACHING OF MINERALS WHICH FORM PRODUCT LAYERS

[75] Inventors: Jan D. Miller, Salt Lake City, Utah; George Simkovich, State College, Pa.

[73] Assignee: University of Utah Research Foundation, Salt Lake City, Utah

[21] Appl. No.: 229,379

[22] Filed: Jan. 29, 1981

[51] Int. Cl.³ .......................... C01G 1/00; C22B 3/00
[52] U.S. Cl. .......................................... 423/1; 423/27; 423/32; 423/109; 423/658.5; 75/101 R; 75/103; 75/104
[58] Field of Search ................... 75/101 R, 103, 104; 423/1, 27, 658.5, 32, 109

[56] References Cited

U.S. PATENT DOCUMENTS

| 3,316,059 | 4/1967 | Vizsolyi | 75/120 |
| 3,856,913 | 12/1974 | McElroy | 423/27 |
| 3,886,257 | 5/1975 | Snell | 423/27 |
| 4,115,221 | 9/1978 | Wadsworth | 204/108 |
| 4,256,485 | 3/1981 | Richardson | 75/101 R |

FOREIGN PATENT DOCUMENTS 964867 3/1975 Canada ................................. 423/27

OTHER PUBLICATIONS

Beckstead et al. in *Extractive Metallurgy of Copper*, vol. II, AIME, N.Y. (1976) pp. 611-632.
Munoz et al. in *Metallurgical Transactions* (10B) (1979) pp. 149-158.
Miller et al. in *Process and Fundamental Aspects of Selected Hydrometallurgical Systems*, SME/AIME (1981).
Beckstead et al. in *Fundamental Aspects of Hydrometallurgical Processes*, AICHE Symp. Series (1978) pp. 28-40.
Wegner in *J. Physical Chemistry Solids*, (1972) pp. 1051-1059.
Mun et al. *Metallurgical Applications of Bacterial Leaching and Related Microbiological Phenomena*, Academic Press, N.Y. (1978) pp. 144, 145.

Primary Examiner—Brian E. Hearn
Attorney, Agent, or Firm—H. Ross Workman; J. Winslow Young; Allen R. Jensen

[57] ABSTRACT

A novel process for enhancing the leaching rate of a mineral wherein the mineral is characterized by the tendency to form a reaction product layer during leaching. A suitable particulate modifier such as carbon is mixed with the mineral prior to leaching and selectively alters the characteristics of the reaction product layer. The process is particularly useful for leaching chalcopyrite, sphalerite and galena.

16 Claims, 3 Drawing Figures

LEACHING OF CHALCOPYRITE BY ACID FERRIC SULFATE SOLUTION

ENHANCED LEACHING OF MINERALS WHICH FORM PRODUCT LAYERS

BACKGROUND

1. Field of the Invention

This invention relates to leaching processes and, more particularly, to improved processes for leaching minerals that tend to form reaction product layers by altering the reaction product layers via additions of particulate modifiers.

2. The Prior Art

It is recognized by mineral and material scientists that the availability of high grade ore deposits continues to decrease as a function of time; therefore, society must rely upon obtaining valuable constituents of ores from low-grade deposits. Low-grade ore deposits present formidable tasks for economical processing and recovery of metallic values. During the past few decades various hydrometallurgical processes for recovery of metal values from sulfide concentrates have been proposed, studied, and in some cases, plants built and operated. Development of hydrometallurgical processes for handling sulfide concentrates has been to provide alternate technology for conventional smelting operations since the latter results in elaborate, and frequently, expensive particle and gas-cleaning systems designed to reduce pollutants to levels environmentally acceptable to society from ethical, moral and lawful points of view.

Environmental acceptance in conjunction with the rising costs of energy and the necessity to process low-grade ores that cannot be economically upgraded by conventional milling, concentration, and smelting techniques, have opened the door to development of hydrometallurgical alternatives to compete with the traditional methods of metal recovery. Accordingly, hydrometallurgical processes are playing an increasingly important role in the development of new technology for processing certain concentrates.

There are several hydrometallurgical routes to recover metal values from mineral concentrates with the result that these alternate routes are potentially competitive with conventional smelters and offer the possibility of direct recovery of sulfur in the solid state.

One of the most critical steps in the hydrometallurgical operations is the dissolution of the subject metal value. Hence, control of the dissolution process is of central and utmost concern to those involved in leaching operations, in practice or in research. To the scientists and engineers utilizing hydrometallurgical systems it is well-known that the kinetics of dissolution may be controlled by:

a. Transport of reactant(s) and/or product(s) to or from the reaction interface;
b. Chemical reaction(s) at the interface; and
c. Mixed control of (a) and (b) when these processes exhibit comparable kinetics.

Generally, although certainly not always, the dissolution of most oxide minerals is controlled by the reaction at the solid-solution interface (point b) while sulfide dissolution processes are more complex and are frequently found to be controlled by transport processes (point a) especially when a product layer forms at the mineral-solution interface.

Historically, the use of acid ferric sulfate solution as a lixiviant for chalcopyrite concentrates has been of little interest from the practical standpoint due to the formation of a relatively tenacious layer of elemental sulfur which severely impedes the reaction progress. This reaction is as follows:

$$CuFeS_2 + 4Fe^{+3} \rightarrow Cu^{+2} + 5Fe^{+2} + 2S° \tag{1}$$

By way of example, an acid ferric sulfate leach of chalcopyrite concentrate conventionally resulted in only 12 percent copper extraction in a three hour leach at 93° C.

Previous experimental results indicated that particle size was the only controllable variable which had a significant effect on the rate of acid ferric sulfate leaching at ambient pressure. A more thorough discussion of the foregoing can be found in Chapter 31 "Acid Ferric Sulfate Leaching of Attritor-Ground Chalcopyrite Concentrates," *Extractive Metallurgy of Copper*, Vol. II, p. 611 (1976), editors, J. C. Yannopoulos and J. C. Agarwal, an International Symposium sponsored by The Metallurgical Society of AIME, New York, New York.

Attention is also directed to United States Letters Pat. No. 4,115,221 issued Sept. 19, 1978 for ACID FERRIC SULFATE LEACHING OF COPPER SULFIDE CONCENTRATES. This patent discloses a novel process for removing copper from copper sulfide-bearing materials. The copper sulfide-bearing materials are ground to a particle size of at most 1 micron and leached in an acidic solution containing a stoichiometric amount of ferric ions. The ferric ions oxidize the copper and form a pregnant leach solution containing copper ions and ferrous ions.

Additional discussion of the foregoing technique can be found in "Reaction Mechanism for the Acid Ferric Sulfate Leaching of Chalcopyrite," P. B. Munoz, J. D. Miller, and M. E. Wadsworth, METALLURGICAL TRANSACTIONS, Vol. 10B, pages 149–158 (June 1979).

Each of the foregoing references relates to the acid ferric sulfate leaching of chalcopyrite with particular emphasis directed toward overcoming the difficulty encountered upon formation of an elemental sulfur layer on the chalcopyrite surface. Importantly, the elemental sulfur layer on the chalcopyrite surface significantly influences the reaction kinetics by establishing a diffusion barrier. While the details of rate control for the particular reaction have not been well established, several theories have been proposed including, for example, the following: (a) Surface reaction—Under certain circumstances, for example, high anodic potentials, it appears that the elemental sulfur does not form a protective barrier and the reaction may be controlled by a surface reaction. (b) Transport in the chalcopyrite lattice or through the elemental surface reaction product layer. When the elemental sulfur reaction product does appear to form a diffusion barrier and the rate becomes limited by transport through this layer, rather large activation energies have been observed. The evaluation of evidence supporting each of these positions has led to divergent views regarding the nature of the rate-limiting step in the reaction sequence.

An electowinning process has been developed whereby a slurry of mineral concentrate is subjected to a leaching process by an oxidant generated and regenerated at the anode while metal values are recovered at the cathode. However, the dissolution of the mineral is still a critical step particularly for those minerals that form a reaction product layer on the surface of the mineral particle.

Another investigation relating to the ferric sulfate leaching of chalcopyrite is set forth in the publication "Electrochemistry in Silver Catalyzed Ferric Sulfate Leaching of Chalcopyrite," J. D. Miller, P. J. McDonough, and H. Q. Portillo, *Process and Fundamental Aspects of Selected Hydrometallurgical Systems*, M. C. Kuhn, editor, SME/AIME (1981). In this study, an enhanced rate of leaching was found to be due to the formation of an intermediate silver sulfide ($Ag_2S$) film which forms on the $CuFeS_2$ surface by an exchange reaction. Under these conditions, unlike the uncatalyzed ferric sulfate leach, the elemental sulfur forms a nonprotective reaction product on the silver sulfide crystallites. As a result, the rate appears to become limited by an intermediate electrochemical reaction in the silver sulfide film rather than by transport through the elemental sulfur reaction product.

In addition to the foregoing, the ammonia oxidation leaching of copper sulfides has been studied and has been reduced to practice on at least two occasions. The chemistry of the oxidation reaction is complex and is influenced by temperature, oxidant concentration, ammonia concentration, ammonium salts, and metal amines. For copper sulfides containing iron, the overall rate of reaction is further complicated by the fact that iron is oxidized to the ferric form and precipitated as hematite, (ferric oxide, $Fe_2O_3$) which, under certain circumstances, also alters the kinetics of the reaction. For example, see "Ammonia Oxidation Leaching of Chalcopyrite," L. W. Beckstead and J. D. Miller, *Fundamental Aspects of Hydrometallurgical Processes*, AIChE Symposium Series, the American Institute of Chemical Engineers, 00658812-78-1159-0173, pages 28–40 (1978).

In view of the foregoing, it would be an improvement in the art to provide a process for enhancing the dissolution of minerals wherein the dissolution of the minerals is characterized by the formation of a reaction product layer about the particles of mineral during the leaching process. It would be an even further advancement in the art to provide a novel process for altering the chemical characteristics of the reaction product layer thereby significantly changing the dissolution rate of the mineral. Another advancement in the art would be to provide a process for including particles having known characteristics within the layer of reaction product. Such a novel process is disclosed and claimed herein.

BRIEF SUMMARY AND OBJECTS OF THE INVENTION

The present invention relates to a novel process for the enhanced leaching of metal values from mineral-bearing ores wherein the minerals are characterized by the formation of reaction product layers on the surface of particles of mineral during the leaching process. The process includes altering the characterisitcs of the reaction product layer by including therein a particulate modifier having the capability of imparting the desired characteristics to the reaction product layer. One suitable particulate modifier is carbon although other particulate materials can also be added. The particulate modifier is intimately mixed with the particles of mineral and has been found to contribute a surprising degree of improvement to the dissolution and, therefore, the leaching rate of the metal values from the mineral.

It is, therefore, a primary object of this invention to provide an improved process for leaching minerals from mineral-bearing ores.

Another object of this invention is to provide an enhanced process for leaching of minerals that are characterized by the tendency to form a layer of reaction products around mineral particles during the leaching process.

Another object of this invention is to intimately incorporate a preselected particulate modifier into a mineral-bearing concentrate to thereby selectively alter the characteristics of a reaction product layer that tends to form about the particles of mineral being leached.

Another object of this invention is to intimately incorporate a finely divided particulate modifier such as carbon into the mineral undergoing leaching.

These and other objects and features of the present invention will become more fully apparent from the following description and appended claims taken in conjunction with the accompanying drawing.

DETAILED DESCRIPTION OF THE PREFERRED EMBODIMENTS

Figure 1:
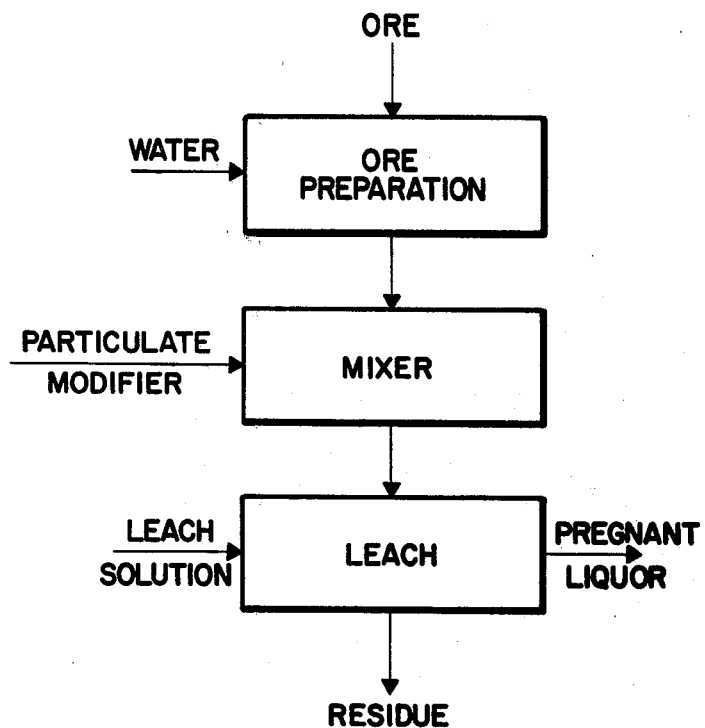
FIG. 1 is a schematic flow diagram of one presently preferred embodiment for practicing the novel leaching process of this invention.

The invention is best understood by reference to the drawing wherein like parts are designated with like numerals throughout and in combination with the accompanying description and appended claims.

GENERAL DISCUSSION

Minerals that tend to form a reaction product layer at the mineral/solution interface include chalcopyrite ($CuFeS_2$), sphalerite ($ZnS$), and galena ($PbS$). Unfortunately, the product layer formed during the leaching process of many minerals tends to adhere tenaciously to the mineral undergoing dissolution. It is suggested that one rate-limiting step for an acid ferric sulfate leach of a sulfide-bearing mineral (chalcopyrite) is the rate of transport of electrons through the reaction product layer. Utilizing the parabolic oxidation relationship, the following has been postulated:

$$\frac{d\alpha}{dt} = \frac{(300)3\Delta G}{\rho_B d_o^2 e^2} \cdot \frac{(1-\alpha)^{\frac{1}{3}}}{[1-(1-\alpha)]^{\frac{1}{3}}} \cdot (t_e \sigma) \qquad (2)$$

Where $\alpha$ is the fraction of chalcopyrite reacted at time t, $\rho_B$ is the molar density of chalcopyrite, $d_o$ is the initial diameter of the particles, e is the electronic charge, $t_e$ is the transport number of electrons in the growing sulfur layer, $\sigma$ is the total electrical conductivity of the sulfur layer, and $\Delta G$ is the Gibbs free energy for the reaction:

$$\tfrac{1}{4}CuFeS_2 + Fe^{+3} = \tfrac{1}{4}Cu^{+2} + 5/4Fe^{+2} + \tfrac{1}{2}S \qquad (3)$$

Under these circumstances, enhancement of the motion of electrons through sulfur should serve to increase the rate of dissolution of sulfide minerals where the rate of growth of the sulfur layer is primarily controlled by this motion of electrons. The foregoing appears to hold for chalcopyrite, sphalerite, and, possibly, galena. The increase in electronic conductivity in the sulfur layers may be initially reviewed in terms of the principles of solid state chemistry as applied to the conductivity of insulators and semiconductors. Thus, the variables generally considered available to obtain changes in the electrical conductivity of a non-metallic material (sulfur) are: (a) a change in the chemical potential of one or more of the components in the material in order to alter stoichiometry; (b) solid solution dopant additions to the material; and (c) a change in temperature.

With the foregoing in mind and taking sulfur as the material of concern herein, it is noted that point (a), above, is not feasible since the sulfur has been found to be essentially pure. In addition, the introduction of a dopant or doping agent in point (b), above, is not too practical although it could be considered. Finally, point (c), above, is also not too practical since present leaching operations are at such high temperatures that a further increase in temperature would call for a pressurized leaching operation.

From the foregoing, one would consider the tactic of increasing the electronic conductivity of the sulfur to be rather limited upon initial considerations. However, a theoretical paper published in 1972 (C. Wagner, J. Phys. Chem. Solids, 38, 1051 (1972)) indicated that the electronic conductivity of an insulator phase may well be increased by the addition of dispersed particles embedded in the matrix, insulator phase. The conductivity increase (or decrease) is due to the emission (or absorption) of electrons from the particles with the creation of a space charge surrounding the particles and compensated by the charge acquired by the particles. This is doping of a phase in a macrofashion, i.e., with particles as opposed to the normal doping procedure utilized by doping with micro (atom/ion-sized) additions.

The foregoing was postulated on the basis that, as noted previously, the change in conductivity of the matrix material is due to the emission (or adsorption) of electrons from the particles into the matrix phase. Assuming that the intrinsic electron carriers are small in number (this is certainly the case for sulfur and most ionic compounds at low temperatures) the conductivity of the system was primarily determined by these extrinsic electrons.

Two limiting cases have been noted; one case relates to the condition where the average concentration of emitted electrons is essentially constant throughout the matrix phase. In this case, the conductivity, $\sigma$, is obtained as $$\sigma = \bar{n}e\mu = \frac{2(2\pi m^* kT)^{3/2}}{h^3} \cdot e\mu \cdot \exp\frac{(-\Delta U_o)}{kT} \quad (4)$$

where n is the average concentration of electrons, e is, as noted previously, the electronic charge, $\mu$ is the mobility of the electrons, m* is the effective mass of the electrons, k is Boltzmann's constant, h is Planck's constant, T is temperature, and $\Delta U_o$ is the energy of transfer of an electron from the particle into the matrix. Note that in this first case, the conductivity, $\sigma$, is an exponential function of temperature and that a plot of ln $(\sigma/T^{3/2})$ vs $1/T$ should be a straight line which permits one to distinguish this first case from the following, second case.

The second limiting case is found whenever the concentration of electrons is a function of distance between the particles embedded in the matrix phase. In this second case, a general solution is obtained and the conductivity is given as $$\sigma \simeq n_2 e u = \frac{const_2 f^{\frac{1}{3}} \epsilon kT\mu}{4\pi e r_2^2} \quad (5)$$

$$= \frac{const^1 f^{\frac{1}{3}} \epsilon kT\mu}{e}(N/V)^{\frac{2}{3}}$$

where $n_2$ is the concentration of electrons at the midpoint between particles, f is the volume fraction of particles in the matrix phase, $\epsilon$ is the dielectric constant of the matrix phase, $2r_2$ is the distance between the centers of the particles, (N/V) is the number of particles per unit of volume, and the other symbols are as previously defined. Note that in this latter case, the conductivity is: (a) directly related to T, (b) inversely related to $2r_2$, (c) directly related to $f^{\frac{1}{3}}$, and (d) directly related to $(N/V)^{\frac{2}{3}}$. Thus, a number of variables, T, $r_2$, f, and (N/V) are available to determine whether this second case applies.

In either case, it is seen that the conductivity may be altered by particles embedded in an insulator phase and, in the case of sulfur on dissolving sulfide minerals as well as perhaps $Fe_2O_3$ in ammonia oxidation leaching of chalcopyrite, one may enhance the transport process of these growing phases by embedding particles in the phases.

Referring now more particularly to FIG. 1, a sulfide-bearing ore material was obtained and suitably prepared by size reduction, advantageously in the presence of water, for economically obtaining the desired particle size as set forth in one of the above-mentioned publications. Thereafter, the sulfide mineral was intimately mixed with a particulate modifier which, in this instance, was a finely divided carbon. The resulting aggregates were suitably leached with an appropriate leach solution. It was found that the particulate modifier surprisingly enhanced the dissolution of the metal values from the mineral.

Figure 3:
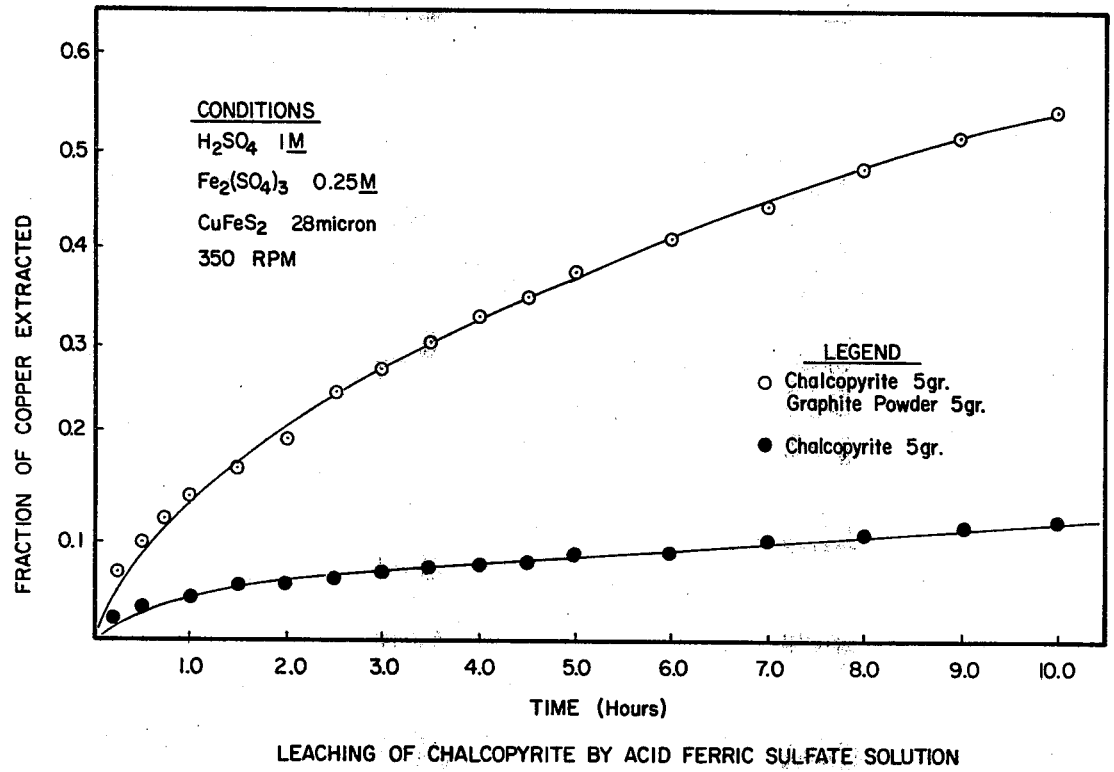
FIG. 3 is a comparison of the fraction of copper extracted in an acid ferric sulfate leach in the presence and the absence of carbon particles.

Experimentally, a preliminary test on the effect of carbon on the rate of dissolution of chalcopyrite in an acid ferric sulfate solution was conducted. The results of this test are depicted in FIG. 3 and, as may be seen from this figure, are quite encouraging. It, therefore, may be tentatively concluded that carbon acts in a manner to increase the electronic conductivity of the sulfur layer which adheres to the dissolving chalcopyrite.

Figure 2:
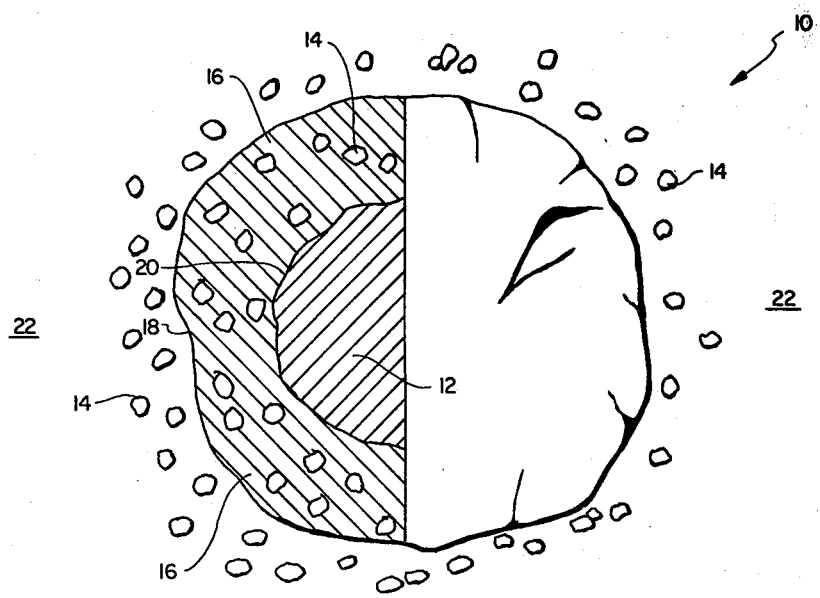
FIG. 2 is an enlarged, schematic, partial cross-sectional view of a particle undergoing the enhanced leaching process of the present invention.

With particular reference to FIG. 2, a particle of mineral-bearing ore is illustrated schematically at 10 as a partial, cross-sectional view to demonstrate the internal mechanism of the foregoing leaching operation. In particular, a preselected mineral particle 12 undergoing leaching develops an outer, reaction product layer 16 which isolates the mineral particle 12 from surrounding leach solution 22. Accordingly, prior to leaching, mineral particle 12 is intimately contacted with a suitable, particulate modifier, particles 14, so that as reaction product layer 16 forms about mineral particle 12, particles 14 become intimately associated therewith. Thus, although an outer, solution/product interface 18 is extended away from an inner, product/mineral ore particle interface 20, particles 14 are believed to provide improvements in the electrical conductivity between leach solution 22 and mineral ore particle 12 thereby significantly enhancing the dissolution of metal values from the mineral particle 12.

Several alternative possibilities exist to explain the results. Among these are the following:

A. It is conceivable that the particulate modifier/sulfur interface facilitates the transport of electrons exclusive of the emission of electrons into the sulfur.

B. It is also conceivable that the electrons from the dissolution reaction are short circuited via conduction through the particles themselves; the aggregation of such particles might provide a short circuit path.

C. Finally, the particles themselves might serve as an electrode in an electrochemical type cell to aid in the dissolution process with the $CuFeS_2$ particles serving as the other electrode.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A process for enhancing dissolution of metal values from minerals comprising:
   obtaining a mineral, the mineral being characterized by the tendency for a reaction product layer to form about particles of mineral during leaching;
   selecting a particulate modifier for suitably altering electronic conductivity characteristics of the reaction product layer;
   altering the electronic conductivity characteristics of the reaction product layer by intimately mixing the particulate modifier with the mineral thereby forming particle aggregates;
   leaching the particle aggregates, the leaching process solubilizing metal values in the mineral while forming a reaction product layer about particles of the mineral ore; and
   enhancing dissolution of metal values in the mineral surrounded by the reaction product layer by increasing electron transport processes across the reaction product layer with the particulate modifier.

2. The process defined in claim 1 wherein the obtaining step comprises providing a sulfide mineral selected from a sulfide-bearing ore.

3. The process defined in claim 2 wherein the providing step comprises selecting the sulfide-bearing ore from the group consisting of chalcopyrite, sphalerite and galena.

4. The process defined in claim 1 wherein the selecting step comprises obtaining a finely divided graphite as the particulate modifier.

5. The process defined in claim 1 wherein the leaching step comprises subjecting the leach mixture to an acid ferric sulfate leach and thereby producing sulfur as the reaction product layer.

6. The process defined in claim 1 wherein the leaching step comprises subjecting the leach mixture to ammonia oxidation leaching and precipitating ferric oxide as the reaction product layer.

7. A process for dissolution of metal values from a mineral comprising:
   obtaining a mineral having metal values, the mineral being characterized by the formation of a reaction product layer about particles of the mineral during leaching;
   selecting a particulate modifier for suitably altering electronic conductivity characteristics of the reaction product layer;
   mixing the particulate modifier with the mineral to form particulate aggregates; and
   leaching metal values from the mineral in the particle aggregates while forming a reaction product layer on particles of mineral, the particulate modifier increasing dissolution of metal values from electron mineral by increasing the transport processes across the reaction product layer.

8. The process defined in claim 7 wherein the obtaining step comprises providing a mineral selected from a sulfide-bearing ore.

9. The process defined in claim 8 wherein the providing step comprises selecting the sulfide-bearing ore from the group consisting of chalcopyrite, sphalerite and galena.

10. The process defined in claim 7 wherein the selecting step comprises obtaining a finely divided graphite as the particulate modifier.

11. The process defined in claim 7 wherein the leaching step comprises subjecting the leach mixture to an acid ferric sulfate leach and thereby producing sulfur as the reaction product layer.

12. The process defined in claim 7 wherein the leaching step comprises subjecting the leach mixture to ammonia oxidation leaching and precipitating ferric oxide as the reaction product layer.

13. A leaching process comprising:
   obtaining a sulfide-bearing mineral, the mineral being characterized by the tendency to form a reaction product layer during dissolution of metal values from the mineral;
   intimately mixing graphite particles with the mineral to form a particulate leach mixture, the graphite particles altering the characteristics of the reaction product layer; and
   dissolving metal values from the mineral with a leach solution, the graphite enhancing transport processes across the reaction product layer thereby increasing dissolution of metal values from the mineral.

14. The process defined in claim 13 wherein the obtaining step comprises selecting the sulfide-bearing mineral from the group consisting of chalcopyrite, sphalerite and galena.

15. The process defined in claim 13 wherein the dissolving step comprises subjecting the particulate leach mixture to an acid ferric sulfate leach and thereby producing sulfur as the reaction product layer.

16. The process defined in claim 13 wherein the dissolving step comprises subjecting the particulate leach mixture to ammonia oxidation leaching and parcipitating ferric oxide as the reaction product layer.

* * * * *

UNITED STATES PATENT AND TRADEMARK OFFICE
CERTIFICATE OF CORRECTION

PATENT NO. : 4,343,773

DATED : August 10, 1982

INVENTOR(S) : Jan D. Miller

It is certified that error appears in the above-identified patent and that said Letters Patent are hereby corrected as shown below:

Column 5, line 55, " n " should be -- $\bar{n}$ --

Column 6, line 5, (formula 5) should be as follows:

$$\sigma \simeq n_2 eu = \frac{\text{const } F^{1/3} \epsilon kT\mu}{4\pi e r_2^2} \qquad (5)$$

$$= \frac{\text{const}^1 f^{1/3} \epsilon kT\mu}{e} (N/V)^{2/3}$$

Column 6, line 18, "$2r_2$" should be -- $r_2^2$ --

Column 8, line 17 in Claim 7 "from electron" should be --from the--

Column 8, line 18 in Claim 7 "the transport" should be --electron transport--

UNITED STATES PATENT AND TRADEMARK OFFICE
CERTIFICATE OF CORRECTION

PATENT NO. : 4,343,773

DATED : August 10, 1982

INVENTOR(S) : Jan D. Miller

It is certified that error appears in the above—identified patent and that said Letters Patent is hereby corrected as shown below:

Column 8, lines 62-3 in Claim 16, "parcipitating" should be -- precipitating --.

Signed and Sealed this

Nineteenth Day of October 1982

[SEAL]

Attest:

Attesting Officer

GERALD J. MOSSINGHOFF

Commissioner of Patents and Trademarks